3,034,984
DRILLING FLUID
Walter J. Weiss, Sugar Land, Tex., assignor to Texaco Inc., a corporation of Delaware
No Drawing. Filed Oct. 8, 1958, Ser. No. 766,153
7 Claims. (Cl. 252—8.5)

This invention relates to drilling fluids. More particularly, this invention relates to aqueous drilling fluids characterized by relatively improved high temperature properties.

One important and desirable property in an aqueous drilling fluid is high temperature stability, e.g., the ability to resist high temperature gelation and/or deterioration when exposed to relatively high temperatures, such as a temperature in the range 250° F. and higher, and the ability to maintain a relatively low water loss under relatively high temperature conditions. Various drilling fluids have been proposed as having improved high temperature properties. Further, various materials have been incorporated in aqueous drilling fluids to improve the high temperature water loss properties of the drilling fluids. Materials which have been incorporated in aqueous drilling fluids to improve the water loss properties thereof include hydrolyzed starch, sodium carboxymethylcellulose, etc. These materials, however, eventually become ineffective upon prolonged exposure to high electrolyte concentration in the drilling fluid and upon continued exposure to relatively high temperature. Also, various materials have been proposed as dispersing agents for clayey material in aqueous drilling fluids. Generally, however, these materials have not performed completely satisfactorily when the drilling mud containing these materials have been exposed to relatively high temperatures.

Accordingly, it is an object of this invention to provide an improved aqueous drilling fluid.

Another object of this invention is to provide a drilling fluid having improved high temperature stability.

Still another object of this invention is to provide a drilling fluid containing an organic clay dispersing agent having improved high temperature properties.

Another object of this invention is to provide an improved method for preparing an aqueous drilling fluid having satisfactory high temperature stability.

How these and other objects of this invention are achieved will become apparent in the light of the accompanying disclosure.

It has now been discovered that an aqueous (water or oil-in-water emulsion) drilling fluid comprising clayey material dispersed in an aqueous phase and containing an organic surfactant characterized by a cationic group and a hydrophilic group exhibits improved high temperature stability. More particularly, it has now been discovered that an aqueous drilling fluid containing an organic surfactant having a terminal cationic group and a terminal hydrophilic group improves the high temperature stability and other properties of an aqueous drilling fluid containing the same.

Various surface active organic compounds characterized by a cationic group and a hydrophilic group may be employed in the practice of this invention. Particularly suitable in the practice of this invention are condensation products of a hydrocarbyl amine and an alkylene oxide. Amines, primary, secondary or tertiary, which are suitably employed in the practice of this invention for the preparation of surface active dispersing agents are the hydrocarbyl (group containing only carbon and hydrogen atoms) amines, the aliphatic amines, such as the alkyl amines. Particularly useful for the preparation of surface active condensation products used as dispersing agents in the practice of this invention are the rosin amines.

Alkylene oxides which are useful in the preparation of amine-alkylene oxide condensation products for use in this invention include ethylene oxide, propylene oxide and the various other higher molecular weight, homologous alkylene oxides. In the preparation of surface active condensation products containing a cationic group (amine portion) and a hydrophilic group (alkylene oxide portion) it is desirable that the molar ratio of the alkylene oxide to the amine portion of the condensation product be in substantial molecular excess to form a strongly hydrophilic group or portion of the condensation product. More particularly, in the preparation of an amine-alkylene oxide condensation product for use in accordance with the practice of this invention it is preferred that the alkylene oxide be condensed with a suitable amine in a molar ratio of at least 10:1, such as a molar ratio in the range 10–100:1.

Various suitable amine-alkylene oxide condensation products are commercially available such as Cronox 1100 sold by the Aquaness Corporation, as well as Polyrad 1700 and Polyrad 4500 sold by Hercules Powder Company, containing one mol of rosin amine to 11, 17 and 45 mols of ethylene oxide, respectively. Other suitable amine-alkylene oxide condensation products include condensation products of an alkyl amine wherein the alkyl group contains from 18–24 carbon atoms with about 25 mols of ethylene oxide. Suitable materials of this type are sold under the trade name Priminox 32 sold by Rohm and Haas Company.

Generally, hole muds, low pH and calcium-base or gyp muds are improved with respect to high temperature stability in accordance with the practice of this invention. The practice of this invention is particularly useful for improving the high temperature stability and other properties of calcium or so-called gyp drilling muds characterized by a relatively high calcium ion concentration and a relatively low pH in the aqueous phase. The so-called gyp muds are usually characterized by a relatively high calcium ion concentration, such as a concentration in excess of 200 p.p.m., and a relatively low pH, in the range 7.5–10.

As indicated hereinabove the practice of this invention is applicable to relatively low pH aqueous muds such as hole muds and similar aqueous drilling muds which are substantially neutral or which do not have a pH in excess of 10.0.

In the practice of this invention any amount of a surfactant having a separate cationic group and a separate strongly hydrophilic group required to effect or provide the necessary improvement in the high temperature properties or stability of the drilling fluid undergoing treatment may be employed. An amount in the range 1–25 lbs., more or less, per barrel of drilling fluid may be satisfactory depending upon the improvement desired in the resulting treated drilling fluid.

As previously indicated, the surfactant material incorporated in an aqueous drilling fluid to improve the high temperature properties thereof in accordance with this invention is characterized as containing a strongly cationic group and a strongly hydrophilic group, each preferably a terminal group. It is theorized that the strongly cationic group of the surfactant firmly attaches itself to the clay particles of the drilling fluid. The other portion of the surfactant, the strongly hydrophilic portion, is then exposed to watery or aqueous environment of the drilling fluid to form, in effect, a protective watery layer therearound, in effect a protected clay colloid is formed. The resulting watery envelope surrounding the clay particles due to the attraction of the water molecules to the strongly hydrophilic group serves to maintain the thus-protected clay particles in suspension and resist or overcome flocculation of the clay particles due to high electrolyte concentration, temperature, etc.

In the practice of this invention any surfactant material which contains a cationic group and a strongly hydrophilic group is satisfactory if it meets the following test. Prepare fully hydrated Wyoming bentonite water slurry of 18–20 centipoises Stormer viscosity at 600 r.p.m. and room temperature. To 50 gram samples of the resulting slurry add 0.4, 0.8, 1.2 and 1.6 grams of the cationic hydrophilic surfactant material. The minimum performance suitable for use in the practice of this invention is a surfactant which, if exhibiting flocculation of the bentonite (due to the cationic portion of the surfactant), will redisperse the bentonite when an amount or by the time an amount of 1.2 grams of surfactant per 50 grams of bentonite slurry has been added or reached. The primary requirement, of course, of a surfactant suitable for use in the practice of this invention is that the surfactant possesses a cationic radical which will be adsorbed on a clay particle firmly enough to resist thermal dissociation therefrom, the surfactant material also possessing a strongly hydrophilic group sufficient to convert the clay particle to a thermally stable complex or colloid.

The following examples are exemplary of the practice of this invention.

EXAMPLE NO. 1

Portions of a water base hole mud (salinity 15,500 p.p.m. Cl−) where treated with a condensation product derived from the reaction of one mol of rosin amine with 50 mols of ethylene oxide. Varying amounts of the condensation product were added to the samples of the hole mud and the properties of the hole mud before and after treatment were observed. The properties of the mud samples after aging for 72 hours at 400° F. were also observed. The data observed in these tests are set forth in accompanying Table I.

Table I

| 1:50 rosin amine-ethylene oxide condensation product, lbs./bbl. | Stormer Viscosity | | A.P.I. Water Loss, ccs./30 min. | Aged 72 hours at 400° F. Stormer Viscosity | |
| --- | --- | --- | --- | --- | --- |
| | 600 r.p.m. | 100 r.p.m. | | 600 r.p.m. | 100 r.p.m. |
| | Cpe. | Cpe. | | Cpe. | Cpe. |
| 0 | 20.7 | 125.6 | 60.0 | 91.3 | 518.1 |
| 5 | 44.9 | 261.6 | ¹ 112.3 | 45.1 | 230.0 |
| 10 | 23.8 | 99.4 | ¹ 73.2 | 28.5 | 108.5 |
| 15 | 22.3 | 94.8 | ¹ 64.0 | 10.1 | 12.6 |

¹ Shows effect of adsorption to yield flocculation and redispersion through adsorption of surfactant.

EXAMPLE NO. 2

A gyp mud containing 8 lbs. per barrel gypsum (CaSO₄), 12 lbs. per barrel of the reaction product formed by reacting 1 mol of rosin amine with 50 mols of ethylene oxide, and 5 lbs. per barrel of a tannin type water loss agent was prepared and its properties tested, before and after aging at 400° F. for 17 hours. The results of these tests are set forth in accompanying Table II.

Table II

| Before Heating—Stormer Viscosity | | Aged 17 Hrs. at 400° F. |
| --- | --- | --- |
| 600 r.p.m. | 44.5 cpe. | 55.1 cpe. |
| 100 r.p.m. | 107.4 cpe. | 158.6 cpe. |
| A.P.I. Water Loss | 2.8 cc./20 min. | 5.2 cc./30 min. |

EXAMPLE NO. 3

Low sodium, salt treated muds containing 5 lbs. per barrel of sodium chloride (NaCl), 12 lbs. per barrel of the reaction product derived by reacting 1 mol of rosin amine with 50 mols of ethylene oxide and 5 lbs. per barrel of a polyacrylate type water loss agent or a tannin type water loss agent were prepared and tested, before and after aging at 400° F. for 72 hours. The results of these tests are set forth in accompanying Table III.

Table III

| Water Loss Agent | Before Heating—Stormer Viscosity | | Heated 72 Hrs. at 400° F. |
| --- | --- | --- | --- |
| Polyacrylate | 600 r.p.m. | 134.5 cpe. | 50.2 cpe.¹ |
| | 100 r.p.m. | 533 cpe. | 125.6 cpe.¹ |
| A.P.I. Water Loss | 0.8 cc./30 min. | | 2.4 cc./30 min. |
| | STORMER VISCOSITY | | |
| Tannin-type | 600 r.p.m. | 58.1 | 77.4 cpe. |
| | 100 r.p.m. | 113.1 | 293.2 cpe. |

¹ Viscosity improved on heating.

As indicated by the above examples, the addition of an organic surfactant characterized by containing both a cationic group and a strongly hydrophilic group improved high temperature stability and other properties of the thus-treated aqueous drilling muds.

As will be apparent to those skilled in the art many substitutions, modifications and alterations are possible in the practice of this invention in the light of this disclosure without departing from the spirit or scope thereof.

I claim:

1. An aqueous drilling fluid characterized by an improved high temperature stability comprising water, clayey material dispersed in and a water soluble calcium salt dissolved in water to yield an aqueous phase having a calcium ion concentration in excess of 200 p.p.m., and as a dispersing agent for said clayey material a condensation product of rosin amine and ethylene oxide, the molar ratio of ethylene oxide to rosin amine in said condensation product being not less than 10, the pH of said aqueous phase being not greater than 10.0.

2. The aqueous drilling fluid of claim 1 wherein the molar ratio of ethylene oxide to said rosin amine is in the range 10–100.

3. An aqueous drilling fluid characterized by having an improved high temperature stability comprising water, clayey material dispersed in and a water soluble calcium salt dissolved in water to yield an aqueous phase having a calcium ion concentration in excess of 200 p.p.m., and as a dispersing agent for said clayey material a hydrocarbyl amine-ethylene oxide condensation product, the hydrocarbyl amine portion containing from about 18 to about 24 carbon atoms and wherein the ethylene oxide portion thereof contains from about 11 to about 50 mols of ethylene oxide per mol of said amine, the pH of said aqueous phase being not greater than 10.0

4. The aqueous drilling fluid of claim 3 wherein said condensation product contains about 25 mols of ethylene oxide per mol of said hydrocarbyl amine.

5. An aqueous drilling fluid having improved high temperature properties which comprises clayey material dispersed in an alkaline aqueous phase, said aqueous phase containing a calcium ion concentration in excess of 200 parts per million by weight and having a pH in the range 7.5–10.0, and as a dispersing agent for said clay material a condensation product of a hydrocarbyl amine and ethylene oxide said condensation product containing from about 11 to about 50 mols of ethylene oxide per mol of said amine.

6. The aqueous drilling fluid of claim 5 wherein said hydrocarbyl amine is an alkyl amine.

7. An aqueous drilling fluid having improved high temperature stability which comprises clayey material dispersed in an aqueous phase, said aqueous phase having a pH not in excess of 10.0 and a calcium ion concentration in excess of 200 p.p.m., and as a dispersing agent for said clayey material a condensation product of an aliphatic tertiary alkyl amine containing in the range 18–24 carbon atoms and ethylene oxide, the molar ratio of said amine to said ethylene oxide in said condensation product being in the range 1:10–100.

References Cited in the file of this patent

UNITED STATES PATENTS

| | | |
|---|---|---|
| 1,970,578 | Schoeller et al. | Aug. 21, 1934 |
| 2,742,455 | Sundberg | Apr. 17, 1956 |
| 2,802,783 | Weiss et al. | Aug. 13, 1957 |

FOREIGN PATENTS

| | | |
|---|---|---|
| 803,544 | Great Britain | Oct. 29, 1958 |

OTHER REFERENCES

Burdyn et al.: That New Drilling Fluid for Hot Holes, article in The Oil and Gas Journal, Sept. 10, 1956, pp. 104 to 107.